United States Patent Office 3,360,941
Patented Jan. 2, 1968

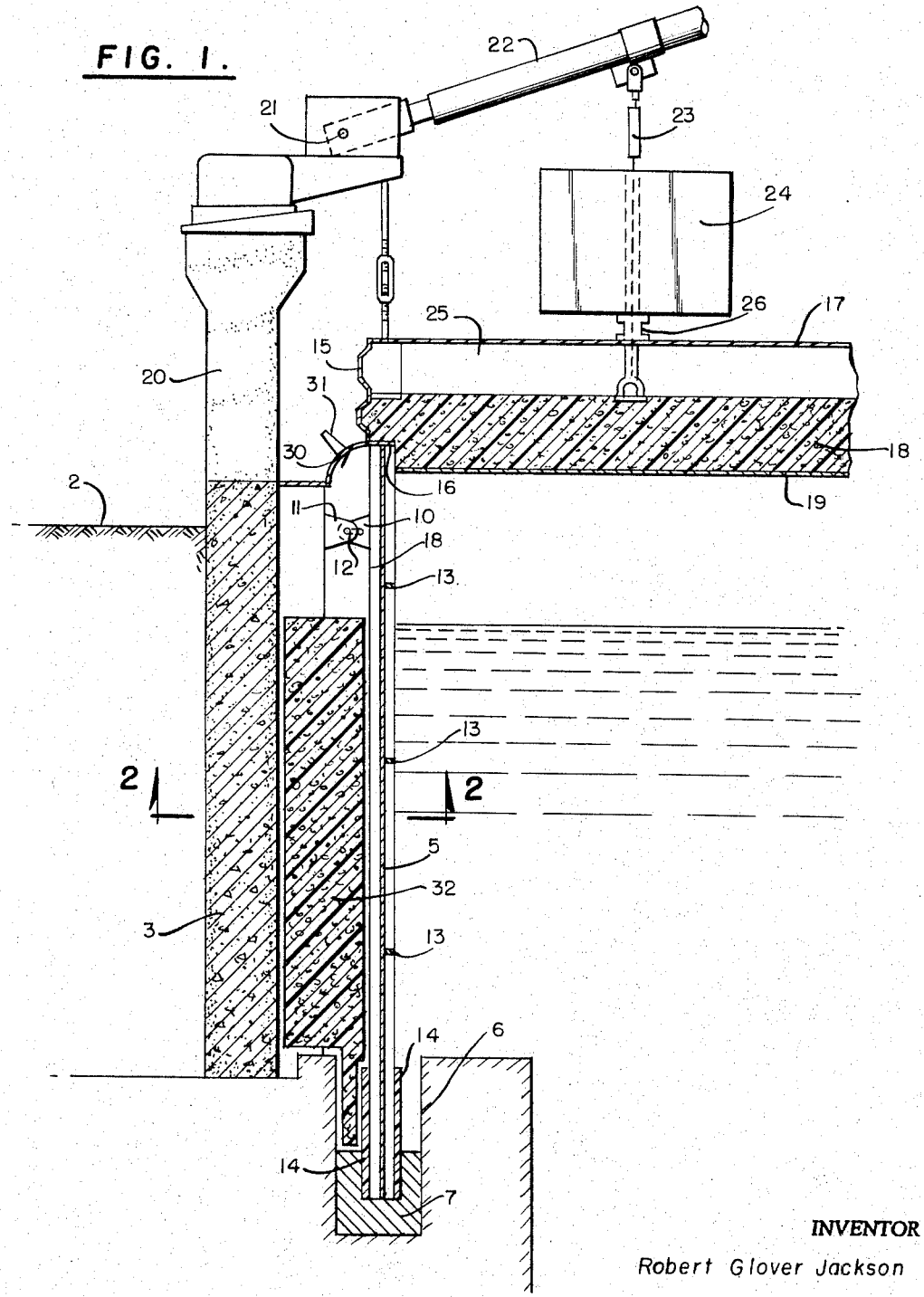

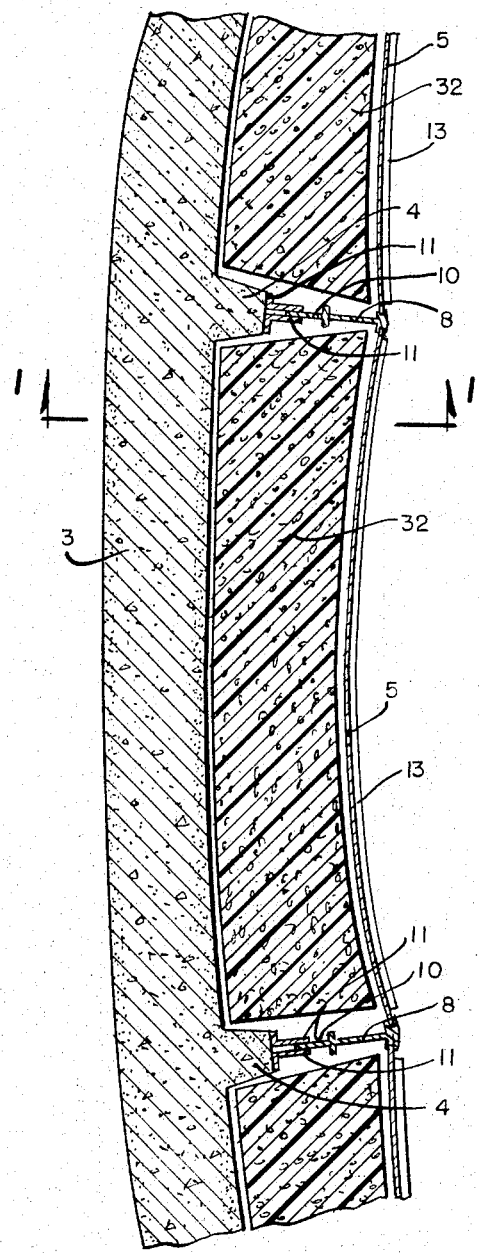
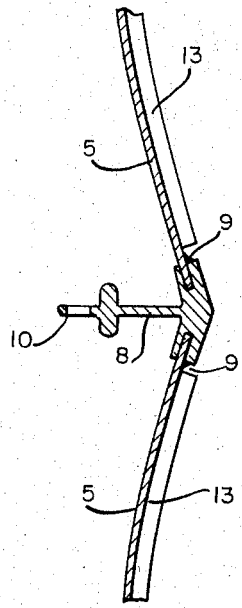

3,360,941
RESERVOIR WITH SEAL FOR LIQUEFIED GAS STORAGE
Robert Glover Jackson, Hornchurch, England, assignor to Conch International Methane Limited, Nassau, Bahamas, a Bahamian company
Filed Nov. 15, 1965, Ser. No. 507,800
Claims priority, application Great Britain, Dec. 15, 1964, 50,979/64
12 Claims. (Cl. 61—.5)

This invention relates to a seal suitable for use in a reservoir for storing a liquefied gas.

According to the invention of U.S. patent application Ser. No. 377,959, a sealing means for use in a reservoir for storing a liquefied gas comprises a continuous fluid-impervious membrane having vertical corrugations extending from the bottom of the membrane to the upper region of the membrane and horizontal corrugations in the upper region of the membrane above the vertical corrugations, a plurality of vertical structural members which are secured to the outside of the membrane at the troughs or crests of the vertical corrugations and which are spaced at intervals close enough for the membrane to be stable against hydrostatic forces exerted thereon and wherein the lower end of the membrane extends into a region which contains a material which is liquid at ambient temperature but which is solid when the membrane is in contact with a liquefied gas.

It has now been found that this seal can be improved if the space between the membrane and the outer supporting structure is filled with an inert gas, such as nitrogen. In this manner, the possibility of moisture outside the membrane freezing and thereby causing heat leaks, is eliminated.

According to the present invention, in an improvement in the invention of U.S. Ser. No. 377,959, a seal comprises a continuous fluid-impervious membrane having vertical corrugations extending from the bottom of the membrane to the upper region of the membrane and horizontal corrugations in the upper region of the membrane above the vertical corrugations, a region into which the lower end of the membrane extends, which region contains a material which is liquid at ambient temperature but which is solid when the membrane is in contact with a liquefied gas, a plurality of vertical structural members secured to the outside of the membrane at the troughs or crests of the vertical corrugations, said members being spaced at intervals sufficiently close for the membrane to be stable against hydrostatic forces exerted thereon, a wall surrounding the membrane fastening means fastening said structural members to the wall, a flexible cover connected to the wall and the membrane above said fastening means, and means for filling the space enclosed by the wall, membrane, cover and solidifiable material with an inert gas.

In this specification the term "liquefied gas" means a liquid which boils at atmospheric pressure at a temperature below the ambient temperature. An example of a liquefied gas is liquefied natural gas.

The membrane, that is material which itself has insufficient strength to support loads to which it is subjected, is preferably metal. When it is in contact with a liquefied gas the metal should be one which will not become embrittled at the low temperatures to which it is subjected, for example stainless steel or aluminum.

The membrane has vertical corrugations and horizontal corrugations, and in this specification, the terms "vertical" and "horizontal" are not to be construed in their strict geometrical sense. The vertical corrugations should extend nearly to the top of the sheet, and in any case above the level of liquid in the reservoir. The ratio of the pitch to the amplitude of the vertical corrugations depends on the load on the membrane and its thickness. For a given load one can either have a low amplitude to pitch ratio and a relatively thick membrane, or a higher amplitude to pitch ratio for a thinner membrane.

The horizontal corrugations are needed at the top of the membrane to allow for dimensional changes of the membrane in the vertical direction. These corrugations need only be few in number, for example two or three.

Preferably the vertically corrugated portion of the membrane, i.e. the fluted skirt is made in more than one piece, especially in sheets which are welded together so that the welds run along the innermost portions of the fluted skirt. In practice, except for very small reservoirs, the horizontally corrugated portion of the membrane, i.e. the corrugated collar is made in several pieces with welded joints preferably running transverse to the corrugations.

It is necessary to join the skirt to the collar, preferably by welding. To do this, pieces of sheet, preferably of the same material as the membrane, can be welded to the tops of and at right angles to the corrugations of the skirt. The collar is then welded to these pieces of sheet. As an alternative to welding separate pieces of sheet, the upper edge of the skirt can be made undulated, the pitch of the undulations corresponding to the pitch of the corrugations of the skirt, and the projecting undulations of the skirt being bent outwardly and then welded to the collar.

The structural members outside the membrane are preferably of the same material as the material of which the membrane is made. The structural members are secured to the outside of the skirt of the membrane, and must extend to above the level of liquid in the reservoir. Preferably they extend the whole length of the skirt, but if desired they may taper off towards the top and bottom of the skirt. The structural members are preferably secured to the furthermost portions of the vertical corrugations when viewed from the outside of the membrane but could be connected to the nearmost portions of the corrugation when viewed from the outside of the membrane.

The structural members are preferably I-shaped beams, particularly modified I-beams in which each of the two feet of the I have recesses for reception of the adjacent sheets of the membrane. The feet are also preferably bent inwards, so that the curved membrane sheets between adjacent structural members do not have sharp bends. The preferred method of securing the structural members to the membrane is by welding. When the preferred form of I-beam is used the membrane sheets are inserted in the recesses, and they are then welded to the I-beams.

If desired the fluted skirt may also be reinforced with stiffeners, for example a series of metal ribs welded to and running round the inside of the membrane substantially at right angles to the direction of the corrugations.

The surrounding wall outside the membrane preferably has inwardly and vertically disposed ribs at regular intervals. These ribs should be spaced so that they coincide with each structural member attached to the skirt. Alternatively, the rib members can be horizontally disposed, e.g. horizontal ribs running right round the wall. The wall and the ribs are preferably made of concrete.

The fastening means fastening the membrane to the wall can be metal brackets welded to the structural members and fixed to the wall, preferably at the ribs. Another suitable fastening means comprises a lug pivotably connected by a pin to two brackets either side of the lug, the lug and brackets being separately connected to the wall, preferably to a rib, and a structural member respectively (or vice-versa). The holes in the lug or in the brackets should preferably be slotted to allow for relative horizontal movement. For each structural member there need only be one fastening means preferably near the top of the fluted skirt.

So that the lower end of the membrane may be sealed into the surrounding formation, said lower end can extend into a continuous gutter, which gutter contains a material which is liquid at ambient temperature but which will be solid when the membrane is in contact with a liquefied gas. When the sealing means is used in a ground reservoir the continuous gutter is preferably formed in the ground as a channel or trench and is of dimensions suitable to receive the lower end of the fluted skirt.

Alternatively, the lower end of the membrane may extend into liquid pervious substance, e.g. detritus such as sand or gravel. The liquid pervious substance contains material which is liquid at ambient temperature but which is solid when the membrane is in contact with a liquefied gas, e.g. water.

The material, liquid at ambient temperature, must be solid at the temperature of the gutter walls or pervious layer when the reservoir is in use. The temperature of this material is a function of the temperature of the stored liquid in the reservoir, the distance between the bottom of the membrane and the reservoir and time. Care must be taken in selecting a liquid which will not freeze too soon, so that undesirable high stresses are not imposed on the membrane before it has reached its equilibrium temperature, and hence its equilibrium position.

Preferably however the inner face or both faces of the lower portion of the membrane are covered with a layer of fluid-impermeable material of low modulus of elasticity, e.g. polyethylene foam or polyvinylchloride foam, so that it is always possible to use any liquid which freezes below ambient temperature such as water. This is because with the layer on the inner face of the lower portion of the membrane there is no danger of high stresses being imposed on the membrane before the membrane has reached its equilibrium temperature.

The flexible cover is preferably made of thin metal and is conveniently of the same metal as the membrane, e.g. stainless steel, aluminum, an aluminum alloy, copper or a high nickel steel. Alternatively however, the cover can be made of other flexible materials, for example, polyvinyl chloride, polyethylene, some synthetic rubbers and nylon. It is clear that some flexibility is required because the lateral movements of the wall and membrane over the whole temperature range to which they will be subjected will differ due to the different coefficients of thermal expansion.

The cover is preferably connected to the top of the wall, and to the bottom of the corrugated collar of the membrane. Thus if the collar is made of metal the cover may be connected to the top of the wall on the one hand and welded to the bottom horizontal corrugation of the collar on the other hand. Other methods of fixing the cover include cementing the cover to the wall and collar by use of suitable adhesives such as epoxy resins or epoxy thiokol adhesives. This method is particularly applicable when the cover is made of a plastic material. Another method is to embed metal strips in the top of the wall when it is being constructed, and then weld the cover to these strips and to the collar of the membrane. Alternatively, the cover can be bolted at each end to the wall and collar or to metal strips secured to the wall and collar during construction, suitable gaskets being provided to seal the joints.

In order to fill with an inert gas the space formed between the wall, membrane, cover, and when the reservoir is in operation, frozen liquid, it is preferable if the cover is provided with one or more inlet pipes provided with valves. By this means this space can be purged of air and then filled with inert gas. Alternatively or in addition the bottom of the space between the wall, membrane, cover and frozen liquid can be provided with a pipe or pipes through which the inert gas can be introduced. Suitable inert gases include nitrogen, and carbon dioxide.

To improve the insulation between the wall and the membrane, the space between the wall and membrane can be filled with a solid but resilient thermal insulation. Examples of such insulation are rock wool, glass fibers, kapik and polystyrene. It is essential that the insulation should not be so rigid that stress is exerted on the membrane when it moves outwardly towards the wall or when the shrinking wall forces the insulation towards the membrane. Preferably the solid resilient insulation does not extend substantially above the liquid level of the reservoir.

Suitable ground reservoirs in which the sealing means can be used are holes in the surface of the earth which holes are impervious to the substance to be stored, for example those holes wherein the surrounding ground formation contains a liquid, e.g. water, which will solidify when the reservoir is charged with the substance to be stored. In such reservoirs wherein the walls are impervious to the substance being stored, the sealing means need only be situated at the top of the reservoir thereby acting as an extension to the reservoir up to the roof level. The top of the corrugated collar can be readily fixed to the periphery of the roof, thus enabling the sealing means to form a gas-tight seal for the reservoir in addition to forming the top part of the reservoir.

The sealing means however is eminently suitable for use in ground reservoirs wherein the side walls would otherwise be permeable to the substance to be stored. In such reservoirs, e.g. ground reservoirs which are holes in the surface of the earth, the membrane acts as a lining and extends right down the sides of the reservoir and is received at the bottom of the reservoir in a region containing the material liquid at ambient temperature. In such cases, however, the bottom wall must be impervious to the substance to be stored. This can in many cases be made impervious by covering the bottom with a layer of clay. The top of the membarne is fixed to the periphery of the roof so that the lining also acts as a gas seal.

The sealing means of this invention whether used in only the top portion reservoir or throughout the whole depth of the reservoir, can of course be used in reservoirs other than the ground reservoirs specifically mentioned above, i.e. they could be used in land storage tanks, that is tanks constructed above the ground.

As mentioned above the sealing means of this invention can be connected to the roof so that it acts as a gas seal. This is achieved by welding or otherwise securing the top portion of the corrugated collar of the membrane to the periphery of the roof.

An embodiment of the invention is now described with reference to the accompanying drawings.

In FIG. 1, a side elevation along the line I—I in FIG. 2 of a sealing means acting as an extension to a ground reservoir is shown.

In FIG. 2 a section on line II—II of FIG. 1 is shown.

In FIGS. 3 a cross-section of the modified I-beam acting as a structural member for the membrane is shown.

Referring to FIGS. 1, 2 and 3 of the drawings, a hole 1 is dug into the ground 2. The top edge of the hole 1 is stepped so as to allow a cylindrical wall 3 to be built. This wall has inwardly and vertically extending ribs 4 spaced at intervals corresponding to the troughs in the corrugated aluminum membrane 5. Inside the wall 3 and the ribs 4 an annular channel 6 is dug. This channel 6 contains water 7 which eventually freezes when the reservoir is in use.

The separate sheets of the membrane 5 are welded at 9 to I-beam sections 8. Lugs 10 are attached to the I-beams 8 and these lugs 10 are pivoted about pins 12 so that they are connected to pairs of brackets 11 attached to the ribs 4. The holes in the lugs 10 are slotted in the horizontal direction to allow for relative movement between the lugs and brackets. The membrane sheets 5 are also strengthened by light aluminum sections 13 welded to the inner surface of the membrane. To the lower end of the membrane are attached strips of low modulus polyvinyl chloride foam 14. This prevents excessive stresses being exerted on the membrane when the water 7 freezes. The corrugated collar 15 is welded to the top of the sheets 5 via segmental strips 16 to make a fluid impervious membrane. The top of this collar is welded to the roof comprising horizontal beams 25, top sheet 17 and insulation 18 carried on expanded aluminum sheet 19. The collar 15 is welded to the roof so as to make a gas-tight seal for the top of the reservoir.

Around the top of the space between the wall 3 and the membrane sheets 5 is a flexible cover 30 consisting of a series of strips of aluminum welded together to form an annular cover strip. The strips are also cemented to the top of the wall and welded to the bottom corrugation of the collar 15. A series of pipes with valves 31 are welded to the cover to allow purging and filling the space between the membrane and wall with nitrogen. Rock wool 32 up to the liquid level of the reservoir is inserted in the space between the membrane sheets 5 and wall 3.

On the top of the wall 3 are piers 20 to which is anchored at 21 one of the ribs 22 constituting the superstructure. The roof is suspended from the superstructure by means of hangers 23. Concrete blocks 24 rest on pedestals 26, thereby counteracting any upward thrust on the top sheet 17.

Before filling the reservoir with liquefied gas, the space between the membrane and wall is purged by introducing nitrogen through the pipes 31. After purging, the space is filled with nitrogen and maintained under slight nitrogen pressure.

It will be apparent that the embodiments shown are only exemplary and that various modifications can be made in construction and arrangement within the scope of my invention as defined in the appended claims.

I claim:

1. A reservoir for storing a liquefied gas comprising a continuous fluid-impervious upright membrane defining an enclosing sidewall of the reservoir, said membrane having vertical corrugations extending from the bottom of the membrane to the upper region of the membrane and horizontal corrugations in the upper region of the membrane above the vertical corrugations, a region into which the lower end of the membrane extends, which region contains a material which is liquid at ambient temperature but which is solid when the membrane is in contact with a liquefied gas, a plurality of vertical elongate structural members secured to the membrane at the troughs or crests of the vertical corrugations, said members being spaced at intervals sufficiently close and of length for the membrane to be stable against hydrostatic forces exerted thereon, a fixed supporting wall surrounding the membrane and spaced therefrom, fastening means slidably securing said structural members to the wall, a flexible cover connected to the wall and the membrane above said fastening means and providing therebeneath between said membrane, said wall and said material in said second named region a sealed space, inert gas filling said space and fluid passage means for conveying said gas between the space and the exterior of reservoir in either direction.

2. A reservoir as claimed in claim 1 wherein the membrane is made of aluminum or stainless steel.

3. A reservoir as claimed in claim 1 wherein the horizontal corrugated portion is welded to pieces of sheet which pieces are also welded to the tops of the vertical corrugations.

4. A reservoir as claimed in claim 1 wherein the inert gas is nitrogen.

5. A reservoir as claimed in claim 1 wherein the space between the wall and membrane is filled with a solid but resilient thermal insulation.

6. A reservoir as claimed in claim 1 wherein the reservoir is a ground reservoir comprising a hole in the surface of the earth, which hole is impervious to the substance to be stored.

7. A reservoir as claimed in claim 1 wherein the structural members are modified I-beams in which each of the two feet of the "I" have recesses for the reception of adjacent sheets which constitute the membrane, and in which said two feet are bent inwardly.

8. A reservoir as claimed in claim 7 wherein the wall has inwardly and vertically disposed ribs disposed at regular intervals, and the structural members are supported on said ribs.

9. A reservoir as claimed in claim 8 wherein the fastening means comprises a lug pivotably connected by means of a pin to two brackets either side of the lug, the lug and brackets being separately connected to the wall and a structural member.

10. A reservoir as claimed in claim 9 wherein for each structural member there is only one fastening means.

11. A reservoir as claimed in claim 1 wherein the region containing a material which is liquid at ambient temperature but solid when the membrane is in contact with a liquefied gas, is a continuous gutter containing said material.

12. A reservoir as claimed in claim 11 wherein the inner face or both faces of the lower portion of the membrane in contact with said material are covered with a layer of fluid impermeable, low modulus material.

References Cited

UNITED STATES PATENTS

| | | | |
|---|---|---|---|
| 1,864,931 | 6/1932 | Pritchard | 220—72 X |
| 2,474,731 | 8/1949 | Wiggins | 48—178 |
| 3,085,708 | 4/1963 | Dosker | 220—9 |
| 3,093,935 | 6/1963 | Dunn | 52—309 |
| 3,096,902 | 7/1963 | Schroeder | 61—.5 |
| 3,175,370 | 3/1965 | Schlumberger et al. | 61—.5 X |

EARL J. WITMER, *Primary Examiner.*